US006601277B1

(12) United States Patent
Swanson

(10) Patent No.: US 6,601,277 B1
(45) Date of Patent: Aug. 5, 2003

(54) PULLER TOOL FOR BOLT SEALS AND THE LIKE

(76) Inventor: Richard C. Swanson, 5 Colony Dr., Orchard Park, NY (US) 14127

( * ) Notice: Subject to any disclaimer, the term of this patent is extended or adjusted under 35 U.S.C. 154(b) by 0 days.

(21) Appl. No.: 10/242,949

(22) Filed: Sep. 13, 2002

(51) Int. Cl.[7] .................................................. B23P 19/04
(52) U.S. Cl. .............................. 29/256; 29/259; 29/264
(58) Field of Search ........................ 29/256, 255, 281.1, 29/263, 265

(56) References Cited

U.S. PATENT DOCUMENTS 3,961,410 A * 6/1976 Reed ........................... 29/256
3,975,040 A 8/1976 Van Gompel
4,798,106 A * 1/1989 Foster ......................... 29/256
5,201,104 A * 4/1993 Winkeljann et al. .......... 29/256
5,727,298 A * 3/1998 Strong ......................... 29/259
5,749,610 A 5/1998 Brammall et al.

* cited by examiner

*Primary Examiner*—Lee D. Wilson
(74) *Attorney, Agent, or Firm*—Hodgson Russ LLP

(57) ABSTRACT

A puller tool for separating a security pin from a mated female part comprises an outer sleeve having an axially extending passage, a radial detent shoulder about the passage at one end of the sleeve, an actuating bolt including a threaded shank axially insertable into the passage and an enlarged head that engages the detent shoulder to prevent further insertion of the actuating bolt into the passage, and a puller member insertable into the passage from an opposite end of the sleeve. The puller member is axially slidable relative to the outer sleeve by rotation of the actuating bolt which mates with a threaded hole in the puller member, and is prevented from rotating relative to the outer sleeve during travel relative to the sleeve. The puller member includes a cavity extending axially and radially through an end thereof to receive the security pin head or female part.

17 Claims, 5 Drawing Sheets

PULLER TOOL FOR BOLT SEALS AND THE LIKE

FIELD OF THE INVENTION

The present invention relates generally to snap-mated bolt seals, security pins and like devices (hereinafter broadly referred to as "security pins") of a general type having an enlarged head and an elongated stem extending from the head, wherein the stem is securely held within a female part when the device is used to securely couple components together in a manner which prevents removal of the security pin except by means destructive to the security pin and/or the mating female part. More specifically, the present invention relates to a puller tool for use in separating a security pin from a female part with which the security pin is mated. The verb "separate" and forms thereof, as used herein in connection with a security pin and female part with which the security pin is mated, shall mean both a nondestructive removal of the security pin from mating with the female part as well as a destructive removal of a portion of the security pin or female part to destroy the locking function of the security pin/female part assembly.

BACKGROUND OF THE INVENTION

Security pins are well-known locking devices comprising an elongated stem and an enlarged head at an end of the stem. Security pins typically work in combination with a female part having an axially extending hole for receiving the pin stem. The internal wall of the hole and the external wall of the pin stem are configured to provide snap-locking coupling of the security pin and female part when the stem is inserted beyond a predetermined axial distance, whereby axially directed withdrawal of the security pin is prevented. Typically, the pin stem is passed through aligned holes in one or more components and then snap-mated with the female part, thereby preventing separation of the locked component(s). As will be appreciated, the female part or security pin may already be integral with a primary component, such that mating serves to attach another component to the primary component. When the security pin is snap-locked with the female part, the enlarged head of the security pin and the female part snuggly confine the locked components together such that access to the stem of the security pin is not available for cutting or other tampering.

In security pin connections of the type described, the security pin head and/or the female part commonly includes a frusto-conical outer surface portion tapered toward the mating part to allow limited access for exerting axially directed force sufficient to separate the mated security pin and female part. It is known to use three-fingered puller tools, hydraulic rams and presses, and custom centerbolt/plate devices for exerting large axially directed forces to cause separation. These devices are cumbersome, expensive, and potentially dangerous if not used in a careful manner.

SUMMARY OF THE INVENTION

Therefore, it is an object of the present invention to provide a puller tool for security pins that is relatively small, inexpensive, and safe to operate.

It is another object of the present invention to provide a puller tool for security pins that accepts an electric, pneumatic, or hydraulic torque wrench and converts the applied torque to an axially directed separation force.

In furtherance of these and other objects, a puller tool for separating a security pin having an enlarged security pin head from a female part with which the security pin is mated generally comprises an outer sleeve having an axially extending passage, an actuating bolt including an enlarged head and a threaded shank axially insertable into the passage, a radial detent shoulder arranged to engage the head of the actuating bolt to prevent insertion of the bolt head into the passage of the outer sleeve, and a puller member insertable into the passage from an opposite end of the sleeve. The puller member is axially slidable relative to the outer sleeve by rotation of the actuating bolt which mates with a threaded hole in the puller member, and the puller member is prevented from rotating relative to the outer sleeve at least when the puller member is fully inserted into the passage. The puller member includes a cavity extending axially and radially through an end thereof. The cavity is configured to receive the security pin head or female part such that the security pin head or female part is removable from the cavity by radially directed but not axially directed extraction.

The puller tool is used by sliding the puller tool radially over a security pin head or female part so that the security pin head or female part is received within the cavity of the puller member, and applying torque to the head of the actuating bolt using a pneumatic torque wrench or the like. A distal end of the outer sleeve bears against one of the locked components, and the puller member is drawn axially further into the passage by rotation of the actuating bolt to load the security pin in tension until the security pin fails.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
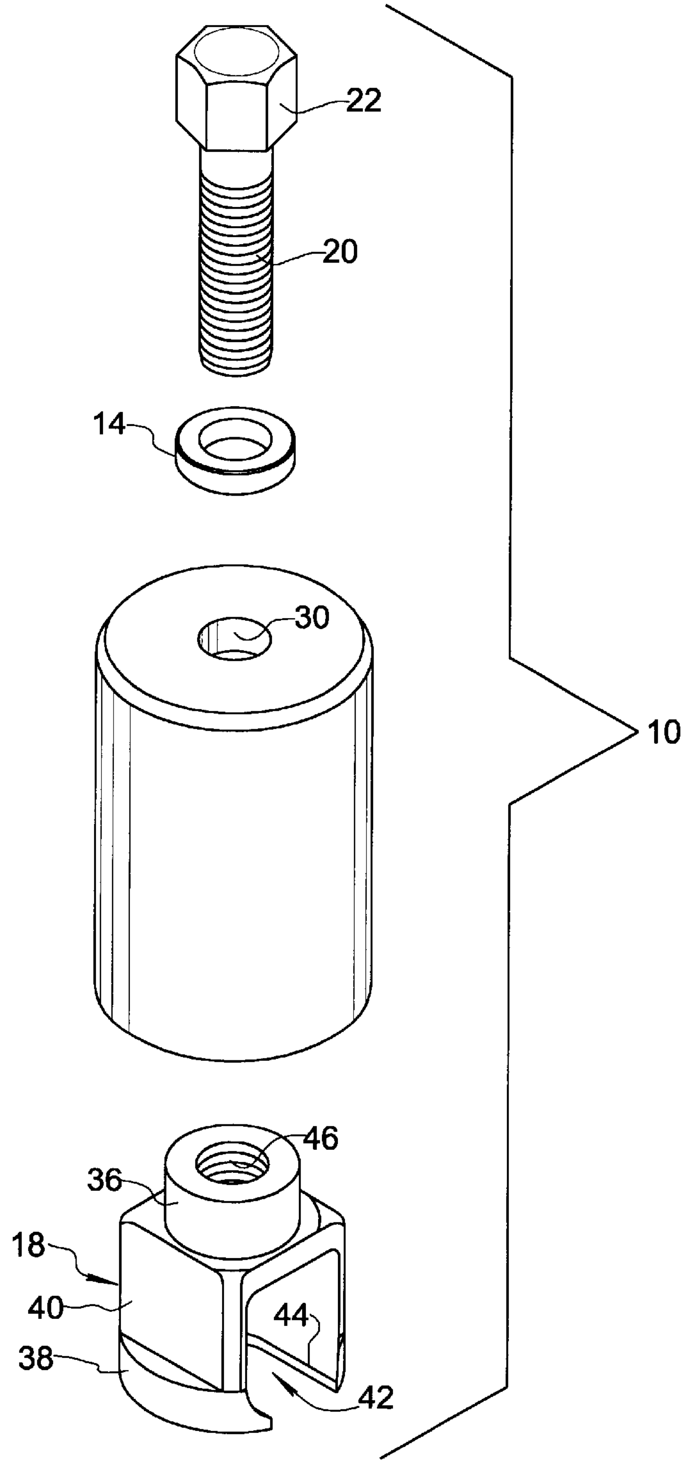
FIG. 1 is an exploded perspective view of a puller tool formed in accordance with a first embodiment of the present invention.

Referring initially to FIG. 1 of the drawings, a puller tool formed in accordance with a first embodiment of the present invention is shown in an exploded depiction and identified broadly by the reference numeral 10. Puller tool 10 generally comprises an actuating bolt 12, an annular spacer 14, an outer sleeve 16, and a puller member 18.

Actuating bolt 12 is a common machine bolt that includes a threaded shank 20 and an enlarged head 22. Head 22 is preferably hexagonal in shape to enable the application of torque to actuating bolt 12 by means of a standard electric, hydraulic, or pneumatic wrench familiar to persons skilled in the art of vehicle maintenance and repair. While a hexagonal shape is preferred, head may include or be of any configuration that facilitates torque transmission from a tool designed to apply torque. Consequently, head 22 might have an internal hexagonal socket for receiving an allen wrench style bit, or the shape of the head (or internal socket) might be some other polygon.

Annular spacer 14 is preferably a metal ring of suitable thickness to limit the length that shank 20 extends within outer sleeve 16, and to more widely distribute axially directed force transmitted between head 22 and sleeve 16. Accordingly, spacer 14 helps to prevent actuating bolt head 22 from digging into outer sleeve 16 during a pulling operation as described below. Although it is a preferred element, spacer 14 is not always necessary for puller tool 10 to operate.

Figure 2:
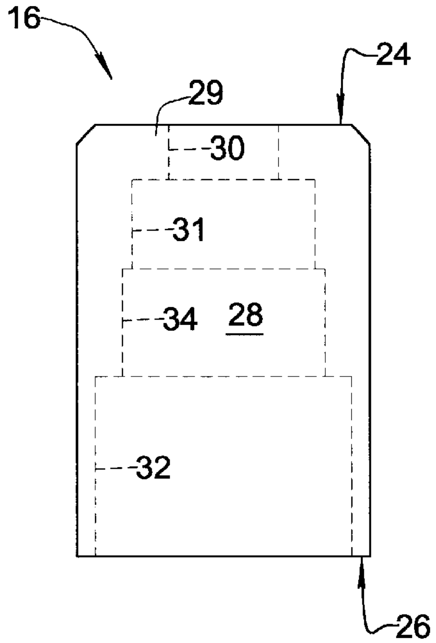
FIG. 2 is an elevational view of an outer sleeve of the puller tool shown in FIG. 1.
Figure 3:
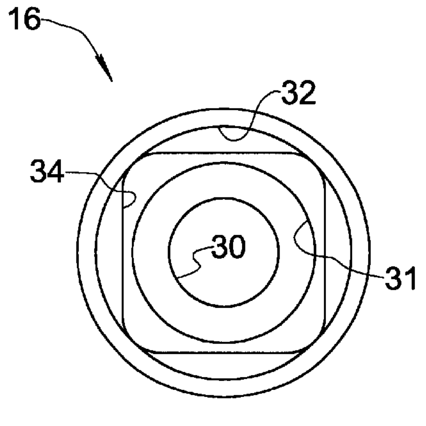
FIG. 3 is a bottom plan view of the outer sleeve shown in FIG. 2.

Outer sleeve 16 of the first embodiment is shown also in FIGS. 2 and 3, and is preferably formed of cylindrical steel bar stock. Outer sleeve 16 includes a first end 24 and a second end 26 connected by an internal passage 28 extending in an axial direction through the sleeve. Passage 28 includes a neck portion 30 adjacent first end 24, a compartment portion 31 adjacent neck portion 30, an envelope portion 32 adjacent second end 26, and a confinement portion 34 between compartment portion 31 and envelope portion 32. Neck portion 30 of passage 28 has a circular cross-sectional shape and is sized to slidably receive threaded shank 20 of actuating bolt 12. First end 24 includes an integrally formed radial detent shoulder 29 about passage 28. Compartment portion 31 of passage 28 has a circular cross-sectional shape of greater diameter than that of neck portion 30. Envelope portion 32 has a circular cross-sectional shape of greater diameter than that of compartment portion 31 and is dimensioned to completely and slidably receive puller member 18. Confinement portion 34 has a non-circular cross-sectional shape for receiving at least a corresponding portion of puller member 18 such that the puller member 18 is slidable in an axial direction relative to outer sleeve 16 but is prevented from rotating relative to the outer sleeve. In a preferred embodiment, confinement portion 34 has a generally square cross-sectional shape with rounded corners, such shape providing two pairs of diametrically opposite flats, although other non-circular shapes are also possible.

Figure 4:
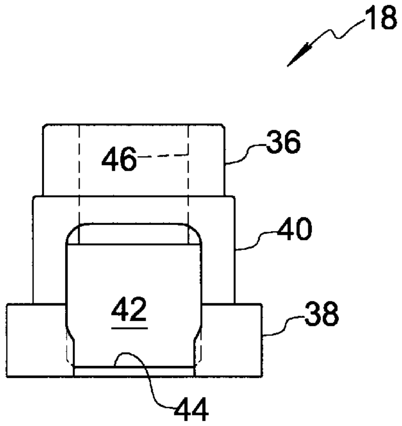
FIG. 4 is an elevational view of a puller member of the puller tool shown in FIG. 1.
Figure 5:
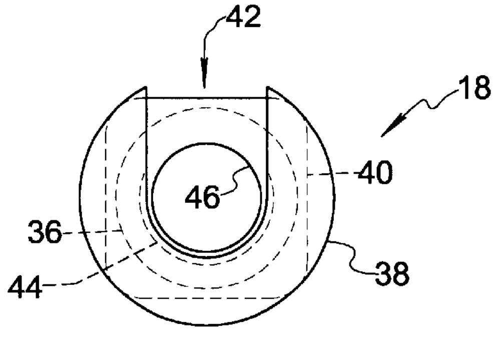
FIG. 5 is a bottom plan view of the puller member shown in FIG. 4.

Puller member 18 of the first embodiment is shown in FIGS. 4 and 5, and is preferably formed of cylindrical steel bar stock. Puller member 18 generally includes a cylindrical leader portion 36 adjacent one end thereof, a base portion 38 adjacent an opposite end thereof, and a confinable portion 40 between leader portion 36 and base portion 38. Leader portion 36 and base portion 38 are both cylindrical and have respective diameters chosen for close slidable fit within compartment portion 31 and envelope portion 32, respectively. Confinable portion 40 is characterized by a non-circular cross-sectional shape, in the present embodiment a generally square shape, that corresponds to the cross-sectional shape of confinement portion 34 of passage 28. As will be understood, when confinable portion 40 is at least partially received within confinement portion 34, puller member 18 is slidable in an axial direction relative to outer sleeve 16, but cannot rotate relative to the outer sleeve. Of course, the cross-sectional shape of confinable portion 40 and confinement portion 34 can be other than square. In particular, it is possible to provide an axially extending keyway in confinement portion 34 for receiving a corresponding key protruding radially from the confinable portion of puller member 18.

Puller member 18 also includes a cavity 42 extending axially and radially through the end of the puller member that is adjacent to base portion 38. Cavity 42 is configured to receive a security pin head such that the security pin head is removable by radially directed but not axially directed extraction therefrom. In the embodiment currently being described, cavity 42 is generally U-shaped as viewed in an axial direction, as can be seen in FIG. 5. Also in this embodiment, cavity 42 is generally rectangular-shaped as viewed in a radial direction of puller member 18, as can be seen in FIG. 4. Cavity 42 defines a wedge-like shelf 44 in puller member 18 for engagement with an underside of the security pin head to prevent the pin head from being pulled out in an axial direction from the cavity.

Puller member 18 further includes an axially extending threaded hole 46 through leader portion 36 which is sized and threaded for mating with shank 20 of actuating bolt 12.

Puller tool 10 is assembled by inserting threaded shank 20 of actuating bolt 12 through annular spacer 14 and into the neck portion 30 of passage 28, inserting puller member 18 into the envelope portion 32 of passage 28, and threadably mating the actuating bolt 12 with puller member 18.

Figure 6C:
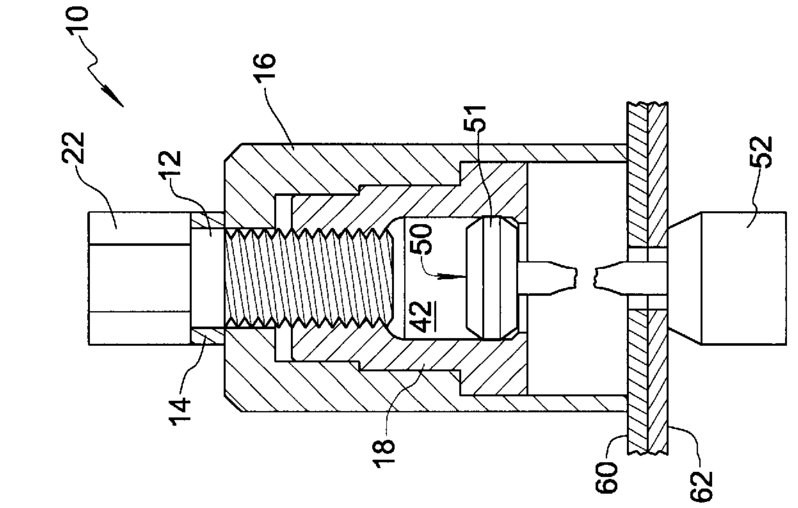
FIGS. 6A through 6C are a series of cross-sectional views of the puller tool shown in FIG. 1, illustrating operation of the puller tool in separating a security pin from a corresponding female part.
Figure 6B:
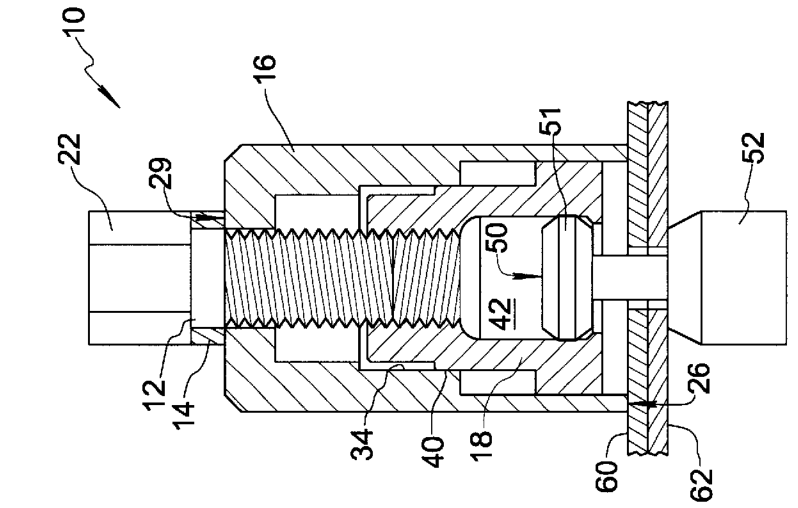
Figure 6A:
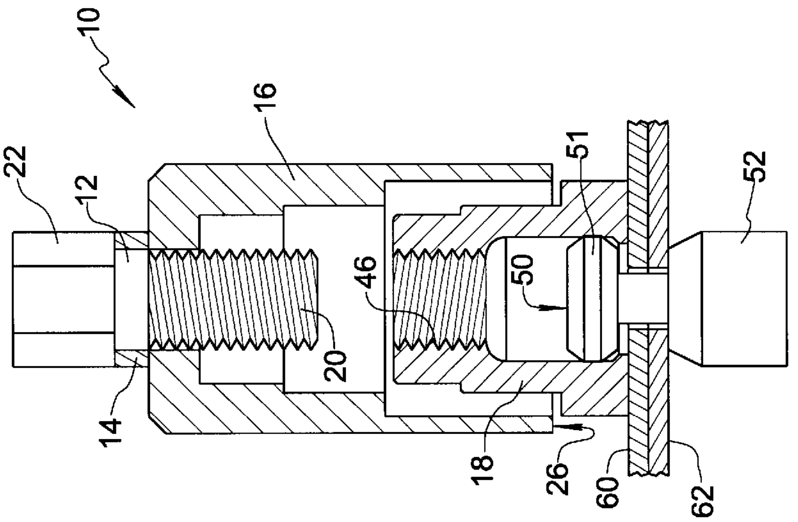

FIGS. 6A through 6C illustrate puller tool 10 of the present invention in operation to separate a security pin 50 from a female part 52 where the security pin and female part are installed to lock components 60 and 62 together. Actuating bolt 12 is initially in a loosened condition depicted in FIG. 6A such that part of the puller member 18 is extendable beyond second end 26 of outer sleeve 16, whereby the puller member 18 can be directed radially relative to a head 51 of security pin 50 so that the head 51 is received within cavity 42. Once head 51 is within cavity 42, second end 26 of outer sleeve 16 is moved into abutment with the surface of component 60 and the outer sleeve is rotated manually until confinement portion 34 of the outer sleeve is in alignment with confinable portion 40 of puller member 18 such that puller member 18 can be advanced axially toward first end 24 of outer sleeve 16 by manually pulling on actuating bolt 12. This brings confinable portion 40 partially within confinement portion 34 to prevent puller member 18 from rotating relative to outer sleeve 16, as illustrated in FIG. 6B. Actuating bolt 12 is then rotated by applying torque to head 22 so as to threadably bring puller member 18 closer to head 22. As will be understood by reference to FIG. 6, once actuating bolt 12 has been tightened to the point where head 22 is flush against spacer 14 and spacer 14 is flush against detent shoulder 29, further tightening rotation of actuating bolt 12 moves puller member axially toward first end 24 of outer sleeve 16. In this regard, outer sleeve 16 acts to maintain a constant distance between head 22 and component 60. Consequently, as puller member 18 is threadably moved, axially directed tension is applied to security pin 50 according to FIG. 6C. It is intended that an electric, pneumatic or hydraulic torque wrench be used to efficiently apply enough torque to actuating bolt 12 to cause failure of security pin 50 or removal of the complete security pin from snap-fitted engagement with female part 52.

Figure 7:
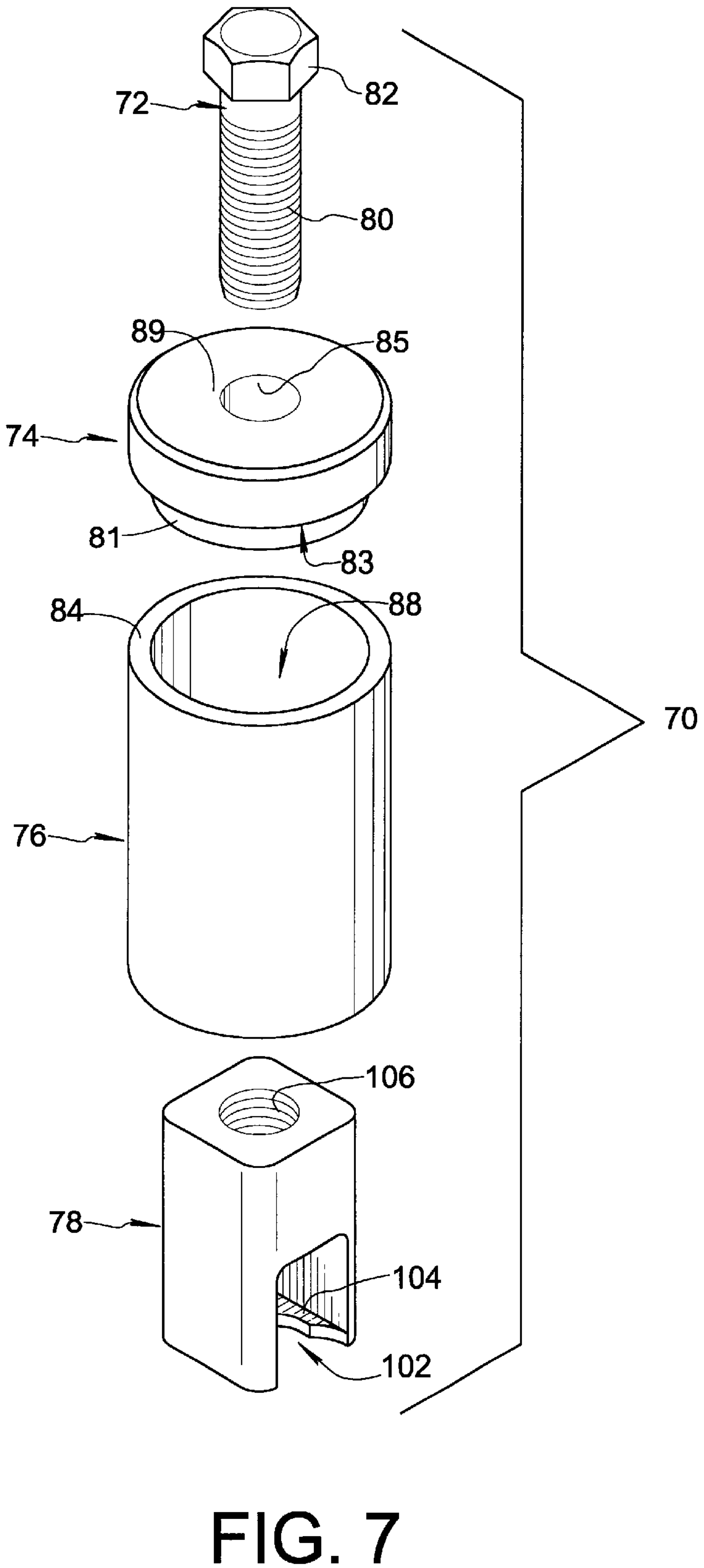
FIG. 7 is an exploded perspective view of a puller tool formed in accordance with a second embodiment of the present invention.
Figure 8:
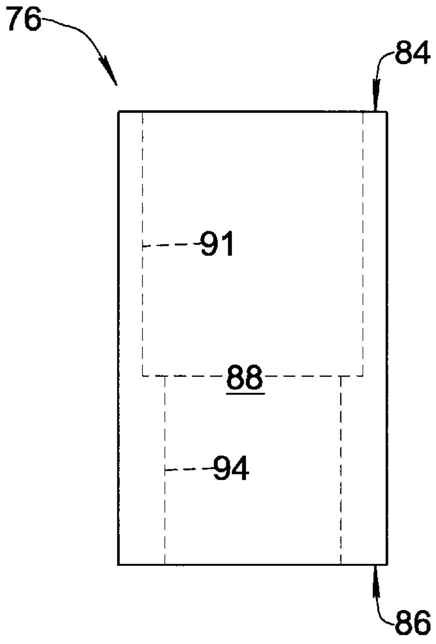
FIG. 8 is an elevational view of an outer sleeve of the puller tool shown in FIG. 7.

FIG. 7 shows a puller tool 70 formed in accordance with a second embodiment of the present invention. Puller tool 70 of the second embodiment is fundamentally similar to puller tool 10 of the first embodiment and generally comprises an actuating bolt 72, a ring-shaped part 74, an outer sleeve 76, and a puller member 78.

Actuating bolt 72 includes a threaded shank 80 and a hexagonal head 82.

Ring-shaped part 74 includes a locator stub 81, an annular abutment surface 83, and a central hole 85 sized to receive shank 80 of actuating bolt 72.

Outer sleeve 76 includes a first end 84 and a second end 86 connected by an internal passage 88 extending in an axial direction through the sleeve. Ring-shaped part 74 abuts against first end 84. As will be understood, ring-shaped part 74 serves to define a detent shoulder 89 about passage 88 at first end 84. Passage 88 includes a compartment portion 91 adjacent locator stub 81 and a confinement portion 94. Compartment portion 91 of passage 88 has a circular cross-sectional shape of greater diameter than that of hole 85. Confinement portion 94 has a non-circular cross-sectional shape for receiving at least a corresponding portion of puller member 78 such that the puller member 78 is slidable in an axial direction relative to outer sleeve 76 but is prevented from rotating relative to the outer sleeve. In the embodiment shown, confinement portion 94 has a generally square cross-sectional shape with rounded corners.

Figure 10:
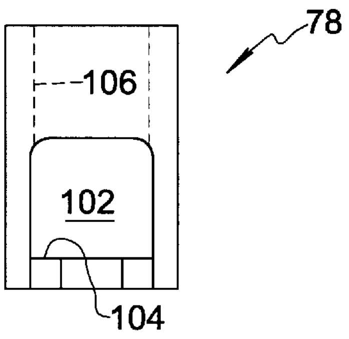
FIG. 10 is an elevational view of a puller member of the puller tool shown in FIG. 7.
Figure 9:
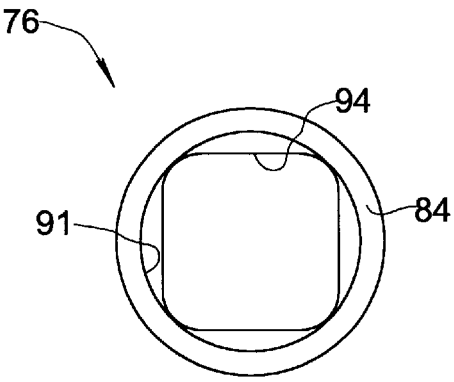
FIG. 9 is a top plan view of the outer sleeve shown in FIG. 8.
Figure 11:
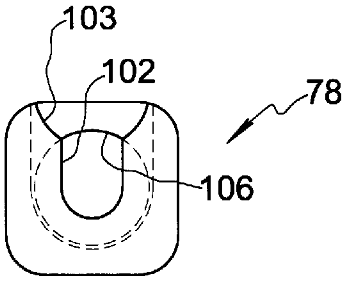
FIG. 11 is a bottom plan view of the puller member shown in FIG. 10.

Puller member 78 of the second embodiment is shown in FIGS. 10 and 11. Puller member 78 is characterized by a non-circular cross-sectional shape, in the present embodiment a generally square shape with rounded corners, that corresponds to the cross-sectional shape of confinement portion 94 of passage 88. Thus, when puller member 78 is at least partially received within confinement portion 94, puller member 78 is slidable in an axial direction relative to outer sleeve 76, but cannot rotate relative to the outer sleeve. Puller member 78 also includes a cavity 102 extending axially and radially through one end of the puller member. Cavity 102 is configured to receive a security pin head such that the security pin head is removable by radially directed but not axially directed extraction therefrom. In the embodiment currently being described, cavity 102 is generally U-shaped with a widened mouth 103 as viewed in an axial direction, as can be seen in FIG. 11. Also in this embodiment, cavity 102 is generally rectangular-shaped as viewed in a radial direction of puller member 78, as can be seen in FIG. 10. Cavity 102 defines a shelf 104 in puller member 78 for engagement with an underside of the security pin head to prevent the pin head from being pulled out in an axial direction from the cavity. Puller member 78 further includes a threaded hole 106 extending axially through an opposite end of puller member 78 and opening into cavity 102. Hole 106 is sized and threaded for mating with shank 80 of actuating bolt 72.

Puller tool 70 of the second embodiment operates in a manner similar to that described above with respect to puller tool 10 of the first embodiment. However, it will be realized that with the second embodiment, insertion of any portion of puller member 78 into passage 88 will prevent the puller member from rotating relative to outer sleeve 76 because puller member has a non-circular shape along its entire length and confinement portion 94 is adjacent second end 86. Here again, it is contemplated to use an electric, pneumatic, or hydraulic torque wrench to rotate actuating bolt 72.

It will be appreciated from the foregoing description that the present invention provides a puller tool that is operable in a very efficient manner in conjunction with an automatic torque wrench to quickly unlock a security pin seal. It will be further appreciated that the puller tool of the present invention is of a modular design, whereby different puller member inserts can be provided for different types and sizes of security pins while maintaining a standardized outer sleeve and actuating bolt. Moreover, several spacers 14 or ring-shaped parts 74 of various thicknesses could be provided.

What is claimed is:

1. A puller tool for separating a security pin having an enlarged security pin head from a female part with which said security pin is mated, said puller tool comprising:

an outer sleeve having first and second opposite ends and a passage extending axially through said sleeve and connecting said first and second ends;

an actuating bolt including a threaded shank axially insertable into said passage of said sleeve through said first end and an enlarged bolt head fixed to said shank, said bolt head being configured for cooperation with a tool for applying torque to said actuating bolt;

a detent shoulder arranged to engage said bolt head to prevent insertion of said bolt head into said passage of said outer sleeve; and a puller member axially received by said passage of said sleeve through said second end, said puller member being slidable in an axial direction relative to said outer sleeve through a range of axial positions wherein said puller member is prevented from rotational movement relative to said outer sleeve, said puller member including an axially extending threaded hole through a first end thereof, said hole being sized for mating with said shank of said actuating bolt, and said puller member further including a cavity extending axially and radially through a second end of said puller member;

wherein said passage includes a confinement portion of non-circular cross-sectional shape, and said puller member has a cross-sectional shape corresponding to said non-circular cross-sectional shape of said confinement portion, whereby said puller member is prevented from rotating relative to said outer sleeve.

2. The puller tool according to claim 1, wherein said cavity is configured to receive said security pin head such that said security pin head is removable by radially directed but not axially directed extraction from said cavity.

3. The puller tool according to claim 1, wherein said cavity is also configured to receive said female part such that said female part is removable by radially directed but not axially directed extraction from said cavity.

4. The puller tool according to claim 1, wherein said detent shoulder is integrally formed with said outer sleeve.

5. The puller tool according to claim 1, wherein said detent shoulder is defined by a ring-shaped part in abutment with said first end of said outer sleeve.

6. The puller tool according to claim 1, wherein said bolt head includes a polygonal configuration.

7. The puller tool according to claim 6, wherein said polygonal configuration is a hexagonal configuration.

8. The puller tool according to claim 1, wherein said non-circular cross-sectional shape includes a pair of diametrically opposite flats.

9. The puller tool according to claim 1, wherein said non-circular cross-sectional shape is a polygon.

10. The puller tool according to claim 9, wherein said polygon is a rectangle.

11. The puller tool according to claim 10, wherein said rectangle is a square.

12. The puller tool according to claim 1, wherein said non-circular cross-sectional shape includes a keyway.

13. The puller tool according to claim 1, further comprising an annular spacer between said bolt head and said detent shoulder.

14. The puller tool according to claim 1, wherein said cavity is generally U-shaped as viewed in an axial direction facing said second end of said puller member.

15. The puller tool according to claim 14, wherein said general U-shape of said cavity includes a widened mouth near a periphery of said puller member.

16. The puller tool according to claim 1, wherein said cavity is generally rectangular-shaped as viewed in a radial direction of said puller member.

17. The puller tool according to claim 1, wherein said cavity defines a wedge-shaped shelf in said puller member for engagement with an underside of said security pin head.

* * * * *